(12) United States Patent
D'Amico et al.

(10) Patent No.: US 9,197,945 B2
(45) Date of Patent: Nov. 24, 2015

(54) INTERACTING WITH TIME-BASED CONTENT

(76) Inventors: Nate D'Amico, Woodside, CA (US); Vijay Chandrasekhar, Singapore (SG)

( * ) Notice: Subject to any disclaimer, the term of this patent is extended or adjusted under 35 U.S.C. 154(b) by 197 days.

(21) Appl. No.: 13/547,193

(22) Filed: Jul. 12, 2012

(65) Prior Publication Data

US 2013/0018936 A1    Jan. 17, 2013

Related U.S. Application Data

(60) Provisional application No. 61/506,997, filed on Jul. 12, 2011.

(51) Int. Cl.
| | |
|---|---|
| *H04N 7/16* | (2011.01) |
| *H04N 21/8358* | (2011.01) |
| *H04H 60/56* | (2008.01) |
| *H04N 21/44* | (2011.01) |
| *G10H 7/00* | (2006.01) |
| *G06F 15/16* | (2006.01) |

(52) U.S. Cl.
CPC .......... *H04N 21/8358* (2013.01); *H04H 60/56* (2013.01); *H04N 21/44008* (2013.01)

(58) Field of Classification Search
CPC ................ H04N 21/8358; H04N 21/44008; H04H 60/56
See application file for complete search history.

(56) References Cited

U.S. PATENT DOCUMENTS

| | | | |
|---|---|---|---|
| 7,793,316 B2 * | 9/2010 | Mears et al. ...................... 725/9 |
| 7,797,186 B2 * | 9/2010 | Dybus ........................ 705/7.32 |
| 8,453,170 B2 * | 5/2013 | Briggs et al. .................... 725/22 |
| 8,577,317 B2 * | 11/2013 | Strandberg et al. ........ 455/179.1 |
| 2005/0115383 A1 * | 6/2005 | Chang ............................. 84/616 |
| 2007/0186228 A1 * | 8/2007 | Ramaswamy et al. .......... 725/14 |
| 2011/0273455 A1 * | 11/2011 | Powar et al. .................. 345/473 |
| 2012/0079515 A1 * | 3/2012 | Wang et al. ....................... 725/9 |
| 2014/0173643 A1 * | 6/2014 | Bhatia et al. .................... 725/13 |

* cited by examiner

*Primary Examiner* — Wen-Tai Lin
(74) *Attorney, Agent, or Firm* — Louis L. Wu

(57) ABSTRACT

Systems and methods are provided for facilitating user and time-based content interaction. Sampling data received from a user device is compared to time-based content. The comparison is carried out, optionally without relying on watermark matching, to determine whether a match exists between the sampling data and the time-based content. Information relating to the sampling data may be transmitted to the user if the identification engine determines that the match exists.

24 Claims, 5 Drawing Sheets

INTERACTING WITH TIME-BASED CONTENT

CROSS REFERENCE TO RELATED APPLICATIONS

This application claims priority to U.S. Provisional Patent Application Ser. No. 61/506,997, entitled "SYSTEM FOR INTERACTIVE EXPERIENCES ON TIME BASED CONTENT USING SECONDARY DEVICES," filed on Jul. 12, 2011, by inventor Nate D'Amico, the disclosure of which is incorporated by reference in its entirety.

BACKGROUND

The invention generally relates to technology that facilitates user and time-based content interaction. In particular, the invention relates to systems and methods that facilitate such interactions by determining, optionally without relying on watermark matching, whether a match exits between user sampling data with time-based content.

Traditionally, electronically transmitted time-based content involved a one-way rather than an interactive relationship between a source of content, e.g., a television station or radio broadcaster, and an audience. Although call-in television and radio programs allowed for a limited degree of real-time interactivity, such programs were the exception rather than the rule. To obtain information relating to audience behavior, sources of time-based content often relied on third-party services and devices such as those provided by Arbitron, Inc. (Columbia, Md.), Such services and devices generally serve to identify and measure an audience's exposure to time-based content and to provide information useful to original sources of time-based content, other sources of content distribution, advertisers, and the like.

With the emergence of multiple, overlapping media distribution pathways, as well as the wide variety of available user systems (e.g. personal, notebook and tablet computers, personal digital assistants, smart phones, Internet appliances, televisions, radios, etc.) for receiving time-based content, the potential of interactivity with an audience has grown exponentially. From the perspective of media distributers, interactivity gives rise to commercial opportunities that were previously impossible. Numerous commercial entities, e.g., Arbitron, Inc. (Columbia, Md.), Audible Magic Corporation (Los Gatos, Calif.), and Shazam Entertainment Ltd. (London, United Kingdom), have sought to capitalize on such potential for interactivity.

From an identification and measurement perspective, there are a number of approaches relevant to user and content interactivity. A first approach involves watermarking, i.e., encoding time-based content with program identification data or other ancillary code. For example, U.S. Patent No. RE 42,627 to Neuhauser et al. discloses watermarking technology. A second approach involves extraction and subsequent pattern matching of "signatures" of the time-based content. U.S. Pat. No. 8,086,445 to Wold et al. provides an example of such signature matching technology. U.S. Pat. No. 7,483,835 to Neuhauser et al. sets froth technology that employs aspects of both watermarking and signature matching. Such approaches may function to assess audience ratings, detect copyright piracy, calculate royalties and verify airings.

From an audience standpoint, consumer electronic devices such as smart phones are now available with the capability to recognize audio/visual based content using technology powered by computer vision software/embedded-hardware. For example, smart phones equipped with optical technologies now allow smart phone to read one- or two-dimensional barcodes on products and print materials. Once a match is found, the smart-phone user may be directed to a website and provided with further information pertaining to the products or print materials.

Bar-code identification and similar technologies for recognizing static rather than time-based content are adequate to provide user-content interactivity in limited circumstances. Typically, such technologies are useful in providing user interactivity with content appearing in print media such as magazines and newspapers. However, such technologies fall short when users wish to interact with time-based content such as radio and television.

Commercial entities such as Shazam Entertainment Ltd. (London, United Kingdom) have attempted to address user desires to identify with time-based content. For example, Shazam Entertainment distributes downloadable apps allow a user to sample music from a primary device, e.g., a radio or television, by using a secondary device, e.g., a mobile phone having a built-in microphone. An acoustic fingerprint or signature based on the sample is created, and is compared against a central database for a match. If a match is found, information such as the artist, song title, and album, is relayed back to the user. Exemplary technology associated with Shazam Entertainment are set forth in U.S. Patent Application Publication Nos. 20120079515, 20120076310, 20110273455, 20110099197, 20080082510, 20020161741, and 20020072982, as well as in U.S. Pat. Nos. 8,190,435, 8,086,171, and 7,881,657.

However, known technologies such as that currently provided by Shazam Entertainment fail to address a number of problems associated with interactions between users and time-based content. For example, a user may wish to interact with 15-30 second commercial spot or other content segment of a similar duration, e.g., a pre- or post-spot announcement occurring during a radio or television program. With previously known technologies, the user would have a small window of time to sample the content segment. By the time the user decides that he or she would like to identify and/or interact with the content segment, and pulls out his or her cellphone to sample the content segment, the segment may be substantially or completely over. That is, there may not be sufficient time to obtain an adequate sample of the content segment to identify the content segment.

Another problem associated with previously known signature-based technologies is that they typically require pre-indexing of time-based content before the content is transmitted to the primary device. That is, only pre-indexed content can be identified later. This limitation does not generally pose a problem for static content such as printed material or a problem for identifying prerecorded, time-based content, such as songs broadcast via radio since such content is created long before they are distributed publicly. However, this limitation does pose a problem for other types of content, e.g., live broadcasts or content produced by those who do not have timely access to pre-indexing technology.

A further problem associated with prior art technologies is the speed of their performance. For example, in prior art technologies for which it is necessary to determine whether there is a match between sampled data and indexed time-based content in a database, the speed at which such a determination may be carried out is generally inversely proportional to the number of entries in the database. As more time-based content is created over time, massive databases with enormous quantities of indexed time-based entries must be employed to increase the likelihood of finding a match between sampled data and content. In turn, throughput or matching speed may be compromised.

Accordingly, opportunities exist to overcome disadvantages associated with known technologies. Such disadvantages may be overcome by employing systems and methods that carry out time-based content analysis in real time. Content analysis may involve indexing time-based content (or streams) using various audio and/or optical recognition techniques. In addition, content analysis may involve automatically and/or manually tagging content for interactions and experiences.

SUMMARY

The invention generally facilitates user and time-based content interaction. Equipment associated with the invention typically includes a system, an apparatus that receives time-based content from a source, and a user device that samples time-based content from the apparatus. Optionally, the source may transmit time-based content substantially simultaneously to the system and to the apparatus. Further, the system may analyze time-based content as it is received.

The invention also typically involves determining whether a match exists between sampling data and time-based content. For example, the system may make such a determination in substantially real time manner, e.g., as the system receives the sampling data and time-based content in a substantially simultaneous manner. In addition, such a determination may be carried out without relying on watermark matching. Optionally, the invention may use locational data to achieve a response time previously unachievable.

In a first embodiment, then a system is provided comprising a content receiver, a content analyzer, a sampling data receiver, an identification engine, and a transmitter. The content receiver is constructed to receive time-based content from a source of time-based content. The content analyzer operates in a substantially real-time manner by analyzing the time-based content as it is received. The sampling data receiver is constructed to receive sampling data from a user device. The device is capable of sampling time-based content from the source, e.g., via an intermediary apparatus that receives time-base content from the source and present the content to the user, substantially simultaneously to when the content receiver receives the time-based content. The identification engine is constructed to determine whether a match exists between the sampling data and the time-based content. The transmitter may be constructed to transmit information relating to the sampling data if the identification engine determines that the match exists. Otherwise, the transmitter may transmit an indication that no match is found.

In another embodiment, a method is provided for facilitating user and time-based content interaction. The method involves receiving time-based content from a source of time-based content and analyzing the time-based content as the content is received. The method also involves receiving sampling data from a user device that is capable of receiving time-based content from the source of time-based content substantially simultaneously to when the time-based content is received. The received sampling data and time-based content may be compared to determine whether there is a match therebetween.

In yet another embodiment, a method is provided for a user to interact with time-based content from an apparatus that receives time-based content from a source and can present, e.g., display, perform, play, or other otherwise present the content to the user. The user-implemented method involves using a device to sample the time-based content received and/or presented by the apparatus, thereby generating sampling data. The user device then transmits sample data to the above-described or similar system and receives information therefrom relating to the sampling data.

In still another embodiment, a method is provided that involves receiving and analyzing time-based content as discussed above, but from a plurality of sources. The method also involves receiving sampling data from a user device that is capable of receiving time-based content from at least one source of time-based content. After a determination is made as to whether a match exists between the sampling data and any of the received time-based content, the source of time-based content, if the match exists, is identified.

In a further embodiment, a method is provided that involves receiving and analyzing time-based content from a plurality of sources. The method also involves receiving sampling data from a user device that is capable of receiving time-based content from the source of time-based content. Within about 6 seconds or less of when the sampling data is first received, the method involves determining whether a match exists between the sampling data received from the user device and any of the time-based content received from the sources and optionally transmit information relating to the sampling data.

In yet another embodiment, a method is provided that involves receiving time-based content from a source of time-based content. The time-based content is analyzed by computing content signatures thereon. Sample data is received from a user device that is capable of receiving time-based content from the source of time-based content substantially simultaneously to when the time-based content is received. The sampling data is matched against the time-based content, and information is sent relating to a content signature associated with a time before the sample data is received.

In still another embodiment, a method is provided that involves receiving time-based content from a plurality of sources and receiving user sampling and locational data from a user device sampling time-based content from an apparatus at a sampling location. The method also involves determining whether a match exists between the sampling data and the time-based content in view of the locational data, wherein the match may exist if at least one source has a transmission range sufficient to deliver the time-based content to the sampling location.

In a further embodiment, a method is provided that involves providing a database of time-based content. Each entry of the database is associated with a time of transmission from a source. User sampling data is received from a secondary device that has sampled output from a primary device capable of receiving time-based content from the source. The sampling data is associated with a time of sampling and/or receipt. Whether a match exists is determined between the sampling data received in step and time-based content in the database in a manner that excludes any entry that is associated with a time of transmission outside within a predetermined timespan relative to the time of sampling and/or receipt.

BRIEF DESCRIPTION OF THE DRAWINGS

The present invention can best be understood in connection with the accompanying drawings. The invention is not limited to the precise embodiments shown in drawings, which include.

DETAILED DESCRIPTION OF THE INVENTION

Definitions and Overview

Figure 1:
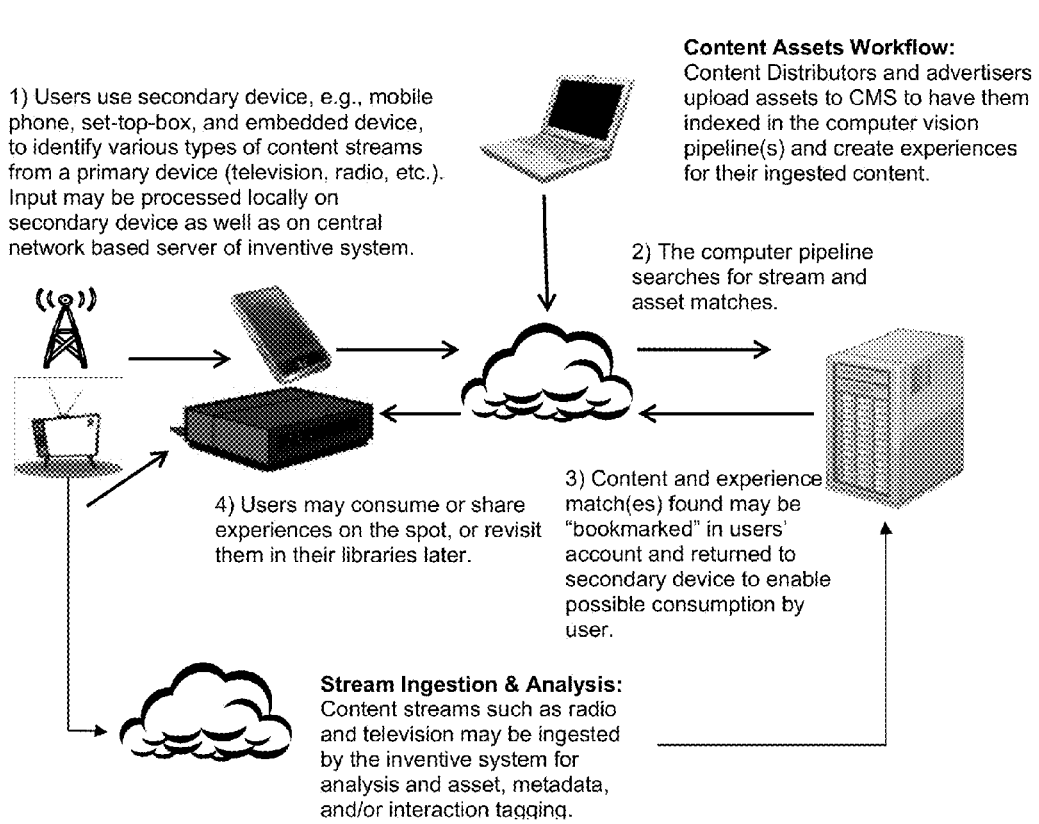
FIG. 1 is a diagram that provides a high-level overview of an exemplary embodiment of the invention.

Before describing the present invention in detail, it is to be understood that the invention is not limited to specific brands or types of electronic equipment, as such may vary. It is also to be understood that the terminology used herein is for describing particular embodiments only, and is not intended to be limiting.

In addition, as used in this specification and the appended claims, the singular article forms "a," "an," and "the" include both singular and plural referents unless the context of their usage clearly dictates otherwise. Thus, for example, reference to "a content asset" includes a single content asset as well as a collection of content assets, reference to "a source of content" includes a plurality of content sources as well as a single content source, and the like.

In this specification and in the claims that follow, reference will be made to a number of terms that shall be defined to have the following meanings, unless the context in which they are employed clearly indicates otherwise:

The terms "asset" or "content asset" are used herein to refer to a subset of time-based content that may be provided, for example, in the form of television and radio shows, motion pictures, segments, advertisements, announcements, and combinations thereof The term "data" is used in its ordinary sense and refers to matter that may be informational in nature. As used herein, the term typically refers to informational matter that may be transmitted by a device, e.g., a user device capable of sampling data from apparatus output, and received by equipment, e.g., a data receiver for receiving sampling data from the user device. Unless the context of their usage clearly indicate otherwise, the terms "data" and "content" are generally interchangeably used. Thus, the term "metadata," meaning data about data, may be used to describe data about content.

As a related matter, both "data" and "content" may be collected as (or divided into) "blocks." In turn, the blocks may be combined to form "chunks." Thus, "data" may be collected as or divided into "data blocks," which in turn maybe combined to form "data chunks." Similarly, "content" may be collected as or divided into content blocks, which in turn may be combined to form content chunks.

A "content management system" is a setup, typically computer implemented, that includes collection of procedures for managing workflow pertaining to content. Exemplary procedures include asset uploading and/or editing, content analysis, audio and/or visual indexing, etc. Additional information relating to CMS is set forth below.

The term "database" is used in its ordinary sense and refers to a collection of related data or entries indexed for convenient and typically electronic access.

The terms "electronic," "electronically," and the like are used in their ordinary sense and relate to structures, e.g., semiconductor microstructures, that provide controlled conduction of electrons or other charge carriers, e.g., holes.

Similarly, the term "equipment" is used in its ordinary sense and refers to any item kept, furnished, or provided for a specific function. Depending on its usage, the term "equipment" may refer to virtual and/or tangible items. For example, the term "electronic equipment" may refer to hardware, firmware, and/or software whose operation involve controlled conduction of electrons in a silicon chip in a digital and/or analog manner to carry out the functionality of the hardware and/or software.

The term "internet" is used herein in its ordinary sense and refers to an interconnected system of networks that connect computers around the world via the TCP/IP and/or other protocols. Unless the context of its usage clearly indicates otherwise, the term "web" is generally used in a synonymous manner with the term "internet." The term "internet" calls forth all equipment associated therewith, e.g., microelectronic processors, memory modules, storage media such as disk drives, tape backup, and magnetic and optical media, modems, routers, etc.

"Optional" or "optionally" means that the subsequently described circumstance may or may not occur, so that the description includes instances where the circumstance occurs and instances where it does not.

The term "receiver" is used in its ordinary sense and refers to equipment that receives transmitted matter, e.g., content, data, or the like, and renders such matter perceptible, e.g., to equipment that analyzes such matter. Transmitted matter may take any of various forms, e.g., broadcast signals, electromagnetic waves, electrical or the like.

The terms "sample," "sampled," "sampling" and the like are used in their ordinary sense and refers to a small part of anything, typically to show the quality, style, or nature of the whole. When a portion of a musical content of a content stream is extracted as a "sample" to identify the musical content and/or the source of the content stream, the musical content and the content stream are said to be "sampled" for identification purposes. Other uses of the term "sample" involve an analogous definition.

It should be noted that content may be sampled in a number of ways. For example, when a user device is said to be "capable of sampling time-based content from a source of time-based content" the user device may receive content directly from the source or, more typically, indirectly from the source via an intermediary device, e.g., a primary device. Thus, indirect sampling may involve a conversion in content format or transmission medium. For instance, content from the source may be wirelessly transmitted in an analog radio frequency signal format to the primary device but may be sampled from the primary device by the user device as optical and/or audio output that may also be perceptible by humans. Similarly, content from the source may be transmitted as a wireless digital signal to the primary device and sampled via a hardwire connection as an analog signal by the user device that is wired, e.g., detachably, to an output signal port of the primary device.

The terms "stream," "streamed," "streaming," and the like are used herein to refer, for example, time-based content that is displayed, performed, played, transmitted or otherwise presented over time. Thus, a stream may comprise a partial asset, a whole asset, and/or a plurality of assets that is displayed, performed, played, transmitted, or otherwise presented in sequence.

The terms "substantial," "substantially," and the like are referred to herein in their ordinary sense and are used to describe matters that are, e.g., considerable in importance, value, degree, amount, and/or extent. For example, when two events are described as taking place "substantially" simultaneously, the events do not have to take place at precisely the same time but should take place at approximately the same time. The events may be shifted in time by a fraction of a second, a second, five seconds, 10 seconds, 15 second, 30 seconds, or even up to a minute to a half hour or one hour in some instances. Similarly, a "substantially" real-time content analyzer that analyzes time-based content as the content is received does not have to begin analyzing content the precise instant that the content is received. There may be a delay of millisecond to one or a few, e.g., three, seconds before analysis begins. Other uses of the terms "substantial" and "substantially" involve an analogous definition.

The term "time-based content" is used to refer to streamed or streamable matter. Typically, the term refers to content that is visually and/or aurally perceptible by a human over a period of time or content that may be rendered visually and/or aurally audio by appropriate equipment, e.g., television, radio, computer, etc., to a human over a period of time. The term "time-based content" encompasses, for example, series of sounds such as music, audio-visual content such as motion pictures, electronic representations thereof, etc.

The term "transmitter" is also used in its ordinary sense and refers to equipment that transmits or otherwise sends matter, e.g., content, data, or the like, that is intended for receipt by a receiver.

The term "watermark" is used in its ordinary intangible sense and relates to embedded pattern in transmittable or transmitted matter. For example, a transmitted signal may contain data that may be rendered visually and/or aurally perceptible by a device such as a television or radio receiver as well as a watermark in the form of a source identification code or other ancillary code that may not be rendered perceptible by the device.

The phrase "without relying on watermark matching," as used herein to describe a process to determine whether a match exists between the sampling data and the time-based content, means that the process is executed without regard to whether the sampling data or the time-based content contains a watermark. Usage of the phrase in this context does not necessarily indicate the absence or exclusion of a watermark in the sampling data or in the time-based content. When the sampling data and/or time-based content contain a watermark, the process is executed in a manner that does not require the watermark to be de-embedded or otherwise separated from the sampling data and/or time-based content. However, the process may use watermark matching to supplement another matching technique such as signature matching, e.g., matching between signal peaks and valleys, between the sampling data and time-based content.

In general, the invention generally relates to technologies, e.g., systems and methods, that facilitate user and time-based content interaction. There are typically at least three items of equipment associated with the practice of the invention, the three items optionally operated and/or controlled independently from each other by different entities. The first is an apparatus (also referred to as a primary device) that can receive time-based content from a source. The second is a user device (also referred to as a secondary device) that can sample time-based content from or presented by the apparatus. The third is a system that may include a receiver for receiving time-based content from the source and plurality of component subsystems, at least some of which may serve to engage in two-way communication with the user device. Optionally, the source may transmit time-based content substantially simultaneously to the system and to the apparatus. Furthermore, the system may analyze time-based content as it is received.

The invention also typically involves determining whether a match exists between sampling data and time-based content. For example, the system may make such a determination in substantially real time manner without relying on watermark matching. In addition, the invention does not require sampling data be compared with a large store of time-content that has not been time-stamped or indexed according to time. Instead, the sampling data may be compared only with time-based content that could have been presented to the user (or that would have been received by the user if appropriate conditions were present) at substantially the same time that the secondary device is engaged in sampling. In any case, the invention may also use locational data or techniques particularly suited for use with time-based content to achieve response times previously unachievable. As discussed below, the invention provides a number of other novel and nonobvious features that may, individually or in any of a number of different combinations, contribute to an enjoyable and productive user experience.

FIG. 1 provides a high-level overview of an embodiment of the invention. As shown in FIG. 1, one or more sources of time-based content may transmit time-based content to a primary device, e.g., a television or a radio. In turn, the apparatus may present (e.g., display, perform, play, transmit, etc.) the content to the user. A user may use a secondary device to sample output from the primary device.

The user device may take any of a number of forms. For example, the user device may be provided as a mobile or cellular phone, a handheld, notebook, or tablet computer, set-top box, or an embedded component of the primary device. In some instance, the user device may include a camera or other optical sensor (and appropriate accompanying hardware and software) to generate optical data for transmission to the inventive system. In addition or in the alternative, the user device may include a microphone or other audio sensor to generate audio data.

Generally speaking, then, the user device may be detached from the apparatus. Alternatively, the user device and the apparatus may be physically connected to each other. The user device and the apparatus may form a unitary item when the user device is an embedded apparatus component.

Independently from the user sampling efforts, the one or more sources of time-based content may also transmit time-based content the inventive system. To illustrate, FIG. 1 shows that the inventive system may include a stream ingestion subsystem comprising a content receiver for receiving time-based content from the source and an analyzer that analyzes the received content. Optionally, the system may include or take the form of server of a distributed network of the client-server computing model. In such a case, the server may operate in an Internet-based and/or in a local area network environment. The received content (or stream) may be ingested, and such analysis may be result in asset, metadata, and/or interaction tagging. The content may be visual and/or audio in nature.

In any case, the stream ingestion subsystem may be adapted to work with any of a number of content sources. For example, the content receiver may be adapted for receiving time-based content from one or more sources of time-based content, e.g., a television station, radio station, and/or an internet content provider. The content may be provided, for example, in the form of cable, satellite, and/or cellular signals.

Also as shown in FIG. 1, the invention may also provide a content management system (CMS), which may represent a subset of the inventive system as a whole. Among the many functions that the CMS may execute (as discussed in detail below), the CMS may allow content distributors and advertisers to upload assets and/or metadata as a part of the content assets workflow. The assets may be audio and/or visual in nature. Uploaded assets such as commercials and metadata may be organized for inclusion in a global asset index and metadata stores, respectively. Optionally, the uploaded assets may also be used to create interactive experience for the user.

In any case, the user device generates sampling data from the content acquired from the primary device. In some instances, raw sampling data may be sent to the inventive system. In other instances, raw sampling data may be processed before being transmitted to the inventive system. Such pre-transmission processing help optimize the allocation of processing workload between the user device and the inventive system, thereby improving the performance of the invention.

The sampling data generated by the user device, e.g., via optical and/or audio sampling, may be sent to the inventive system. At the same time, the primary device and the inventive system may receive the time-based content substantially simultaneously. As a result, when the sampling data is transmitted as the output of the primary device is being sampled, the inventive system may also receive the time-based content and the sampling data substantially simultaneously with little delay. Alternatively, data transmission may take place afterwards after sampling efforts have ceased. Any data receiver employed by the inventive system should be compatible with the format of the sampling data sent by the user device.

Once the sampling data is received by the data receiver of the inventive system, an identification engine determines whether a match exists between the sampling data and the time based content. Optionally, the stream ingestion subsystem may also be used to analyze sampling data from the user device beforehand. As shown in FIG. 1, visual/aural computer pipeline search may be performed to match the received sampling data and uploaded assets as they appear in the ingested stream. Any interactive experience match found is bookmarked in a library for the user's account and at least information pertaining to the match is returned to the user device. The user may then use the device to consume and/or share interactive experiences on the spot or revisit them later.

Content Asset Workflow and Associated User Experience

While the invention typically provides an asset database, the inventive system may handle content assets differently. In some instances, the invention allows content producers and/or distributers to upload assets into the CMS of the invention. In some instances, the assets are provided in pre-indexed format before they are uploaded into the inventive system. Alternatively, a content analyzer may be used to ingest and/or index assets after upload according to audio and visual characteristics. Ingestion and/or indexing may be executed manually and/or automatically. Optionally, content producers and/or distributers may define and/or create one or more experiences and link them to one, some, each or all asset as appropriate.

Figure 2:
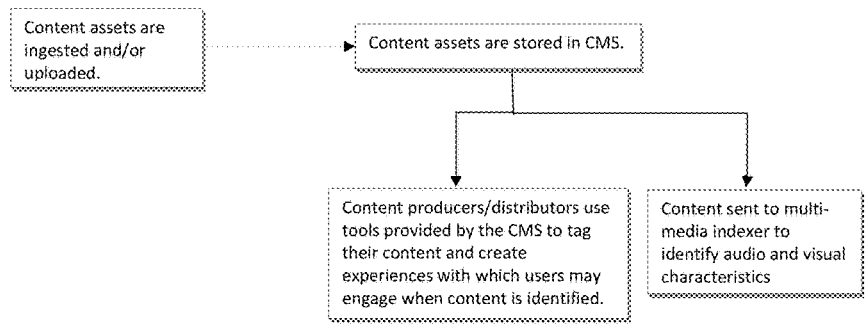
FIG. 2 is a flow chart that illustrates an example of an optional content asset workflow associated with a content asset database, e.g., containing commercials and other matter uploaded by producers and/or distributers.

An exemplary content asset workflow is shown in FIG. 2. The exemplary workflow begins with the ingestion and/or uploading of content assets. Once the content assets enter the inventive system, they may be stored in a content asset database of the CMS. There, producers and/or distributers may use tools provided by the CMS to tag their assets manually, thereby creating experiences for later user engagement. In addition or in the alternative, content stored in the CMS may be sent to a multimedia indexer for identification according to their audio and visual characteristics. As discuss below, such identification may involve the creation of signatures and cues.

The CMS also assists in facilitating interaction between the user and time-based content. As discussed above, the user instruct the user device to may send sampling data to the inventive system. By doing so, the user may be effectively asking the system to determine whether there is a match between the sampling data and content in the CMS. When a match exists, a transmitter of the system may transmit information relating to the sampling data to the user device. The information may be useful to the user for engaging in an experience created by the producer and/or distributer of the matching content in the CMS. Such an experience may include an activity such as: linking to, and delivery of content (e.g., web, audio, and/or video multimedia); participating in a survey, quiz, or poll; initiating or taking a call (e.g., via click-to-call technology); requesting for information (e.g., for lead generation); engaging in a commercial transaction; adding a calendar event or reminder; and adding a contact to an address book. Other experiences are possible as well.

Stream Workflow

As discussed above, the invention may allow any of a number of entities to upload their content for analysis. This may be done, for example, when producers and/or distributers set up stream feeds for receipt by a server CMS. Alternative, stream feeds may be created without participation on the part of the source, producer or distributer of the time-base content. When one or more stream feeds are "activated" and associated content is received by the inventive system, the inventive system is said to have gone "live."

In some embodiment of the invention, the server CMS, once live, will spin up a new stream agent (also referred to as a "content ingestion engine"). The stream agent may register itself once the system is ready to begin start the ingestion process.

Content for ingestion may be received via any of a number of different means. For example, a socket connection may be opened up to an audio and/or video stream of any appropriate internet protocol, e.g., Hypertext Transfer Protocol. As another example, the system may directly pick up a broadcast feed via a television tuner or digital video broadcasting equipped computer card or a cable feed via a cable card equipped computer device. The system may indirectly pick up a live radio and/or television broadcast through via use of a microphone and/or camera monitoring output of content from a radio and/or television.

As the stream agent ingests the received content, the stream agent may collect the content as content blocks or may divide the content into content blocks. Optionally, the invention allows the content blocks to be of configurable duration or of a duration selected for optimal for later processing needs. In some instances, the blocks may be combined to form chunks. For example, a real-time multi-media indexing engine (e.g., a computing subscriber) may analyze and index audio and/or visual characteristics of one or more content blocks or chunks. Similarly, an asset identification engine (a searching subscriber) may search one or more content blocks or chunks against the asset database. Once identified, cues may be are inserted in the cue database.

Typically, the system is capable of receiving time-based content from a plurality of sources of time-based content. The time-based content may be received simultaneously or otherwise from the sources, e.g., via cable, satellite, and/or cellular signals. Thus, the invention usually may employ one or more stream agents at a time.

Figure 3:
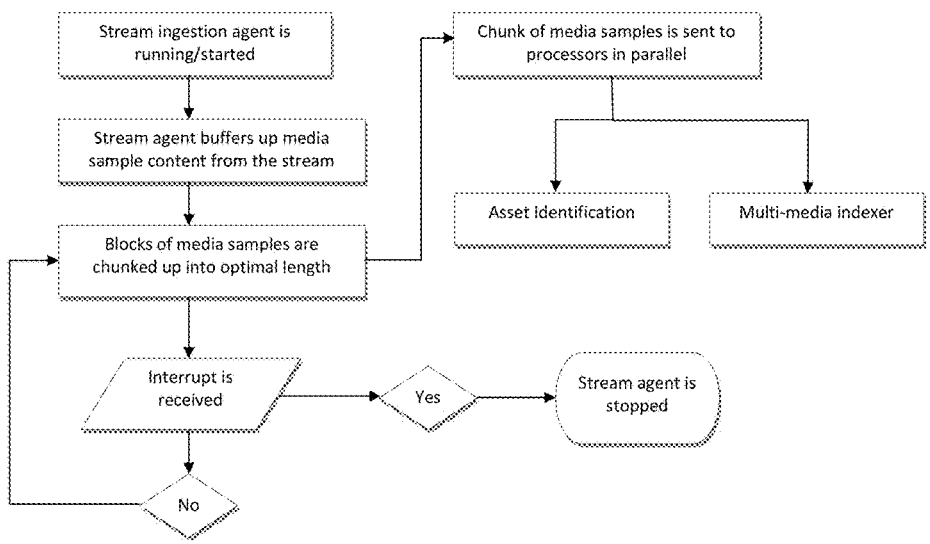
FIG. 3 is a flow chart that illustrates an example of a stream content ingestion workflow associated with content from a source of time-based content.

FIG. 3 depicts an exemplary stream content ingestion workflow. The exemplary workflow begins when a stream is received and a stream agent is started. The stream agent buffers up media content from the stream and collects the content as blocks. The blocks are combined to form chucks. In some instances, chunks are processed in parallel for asset identification and indexing. Alternatively, an interrupt command is received, and the stream agent ceases operation as a result.

In short, the CMS may include a content analyzer comprising an ingestion engine. Depending on the particulars with respect to a specific content asset workflow, e.g., as discussed above, the engine may operate in a substantially real-time manner or otherwise. The content ingestion engine serves to collect content received by and/or uploaded to the CMS as content blocks. Also provided may be a signature storage unit for storing content signatures, pre-computed or otherwise. Such signatures may be computed by a computing subscriber that computes content signatures on the content blocks. In addition or in the alternative, a searching subscriber may search the content blocks against the pre-computed content media signatures to determine whether there is a match. Neither, either, or both subscribers may generate at least one cue, e.g., of an interactive and/or metadata nature, to mark at least one interactive point in the time-based content.

Parenthetically, as discussed below, the ingestion engine or similar equipment may also be used to collect sampling data received by the inventive system as data blocks for optional combination as data chunks.

Cues

The inventive system may also employ cues as markers for time-based content. In particular, cues may be used to mark interactive points in time-based content. As discussed below in detail, asset and/or metadata identification by a searching or computer subscriber may cause the inventive system to insert cues in a cue database. Similarly, user scheduling may result in cue insertion. In any case, the cues, in turn, provide users of the invention with a user experience that comport with anticipated user behaviors and desires.

For example, when driving, a user may wish to use a device to identify contents of interest on a radio station broadcast stream. However, the user may not act fast enough to sample a snippet of the content of interest in time for the device to identify the contents of interest on the spot. Instead, the user may end up sampling content streamed after the content of interest. With the inventive system, cues may allow a search to be performed against the sampled content to identify which radio station broadcast with which the user is interacting. The system may then check for one or more cues matched over a window of time for the broadcast stream for the radio station of interest.

Any matching cue, asset, and/or information, identifying or otherwise, relating thereto may be transmitted and displayed to the user via the user device. If multiple cues are found within the match window, the system may prompt the user with multiple results. In some cases, the results could be ordered by default in a time-based manner. Other ordering variants are possible as well. For example, the result ordering may be set by the user according to content distributor identity. Optionally, "sponsored interactions" may be presented to the user in a prominent manner, e.g. at the top of a list of results.

In any case, other variations are possible. For example, as alluded to above, information transmitted and/or displayed to the user may pertain to time-based content of interest occurring before and/or during sampling. Optionally, information occurring during sampling may be excluded.

Exemplary Time-Based Content Interaction And Workflow

As discussed above, the invention contemplates a scenario in which users may use a primary device in conjunction with a secondary device to consume and interact with time-based content, the content having been enabled for user interaction. In such a scenario, the primary device will present the user with content that the user may finds something interesting. As a result, the user may use a secondary device, e.g., a mobile phone, set-top box, or a function embedded in the primary device, to trigger an analysis attempt. Any of a number of triggering mechanisms may be used. Suitable triggering mechanisms touch, sound, and/or light input. For example, the user may trigger an analysis attempt by pushing a button on the secondary device or on a touch screen thereof, using a remote control, using speech or voice command, employing light-based input, presetting the secondary device to monitor content displayed by the primary device, etc.

The secondary device will then begin to sample content for analysis. Content analysis may involve processing sampling data both locally on the secondary device as well as on the inventive system, which may comprise a central network connected server. In addition, the analysis may be performed in an incremental manner so that the user may be informed of any match found as quickly as possible.

If a content stream match is found, the server will look up all active cues related to the matching stream for a window of time (such as 30 seconds). Found cues will trigger the system to look up any corresponding active experiences that have been defined. Such experiences may be delivered back to the user to be consumed, carried out, and/or recorded as an event of the user's interactive history.

Figure 4:
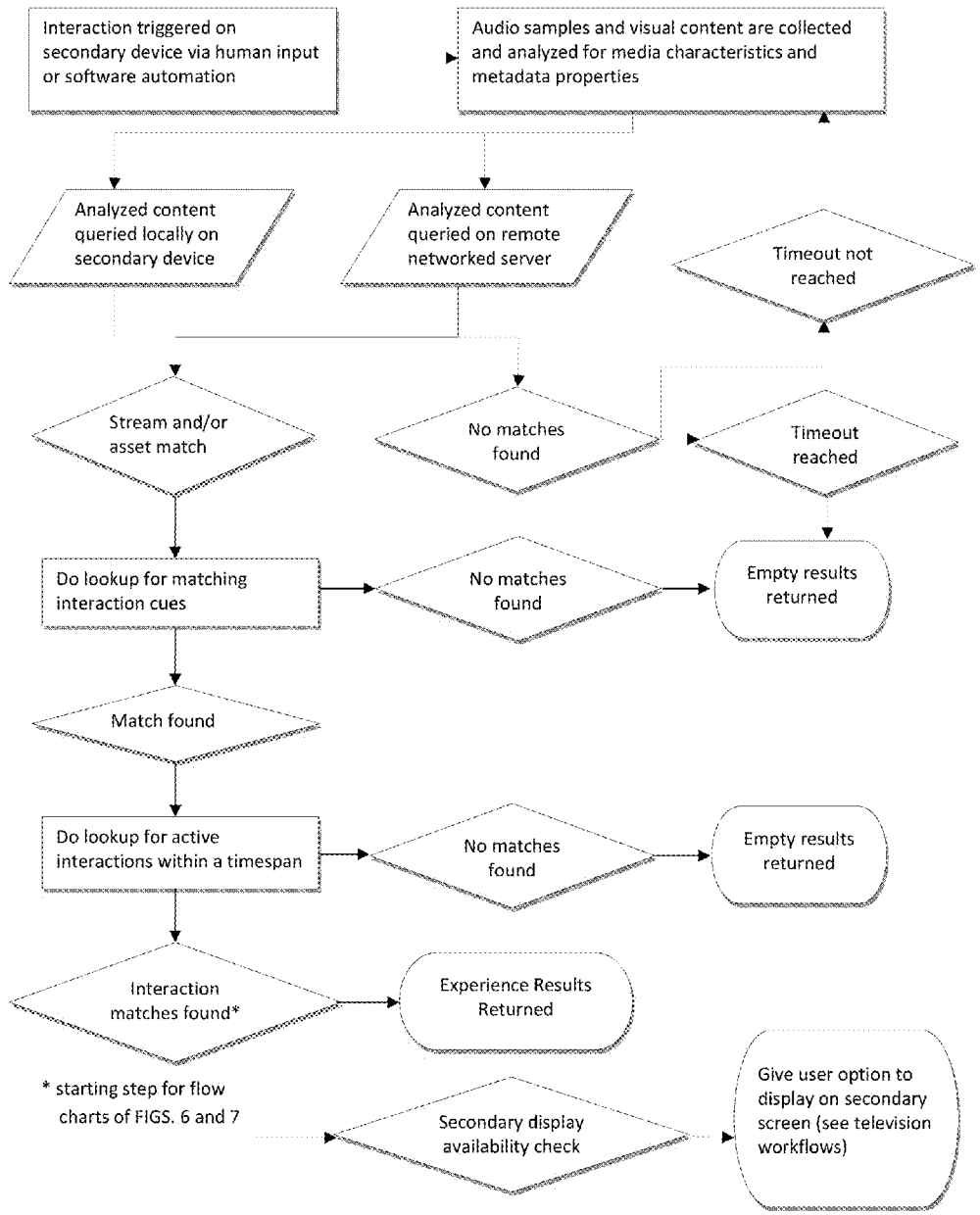
FIG. 4 is a flow chart that illustrates an exemplary interaction workflow triggered by a user device.

FIG. 4 is a flow chart that illustrates an exemplary interaction workflow triggered by a user device. The workflow begins when an interaction is triggered on a secondary device via human input or software interaction. As a result, audio and visual samples are collected from a primary device and analyzed for media characteristics and metadata properties. The samples may be collected as sample data blocks of a configurable duration.

Parenthetically, blocks of the invention, regardless whether they are sample data or time-based content blocks, may have a duration of anywhere from about 1 to about 6 seconds. Typically, though, an initial block may exhibit a longer duration than subsequent blocks. For example, an initial block may exhibit a duration of about four seconds by subsequent blocks may last only about 2.2 seconds. However, blocks duration may be lengthened or shortened as desired.

Returning to FIG. 4, the analyzed samples are then queried locally on the secondary device and remotely on a network server. When a stream and/or asset match is found, a lookup is performed to see if there is a matching cue. Otherwise, additional samples are collected, and sample chunks formed from the collected sample blocks may be analyzed for additional query until timeout. Similarly, when a matching cue is found, a lookup is performed to see whether there is any active interaction within a predetermined timespan. Empty results may be returned if no stream and/or asset are found by timeout, if no matching cue is found, or if no active interaction within the predetermined timespan is found. Time out usually occurs within no more than 1 minute, preferably no more than 30 seconds. The predetermined time span typically does not exceed 24 hours, preferably may not exceed 12 hours, and optimally may not exceed 1 hour.

Once an active interaction is found, experience results are returned, e.g., to the primary device and/or secondary device according to the user's choice.

Exemplary User-Radio Interaction

Figure 5:
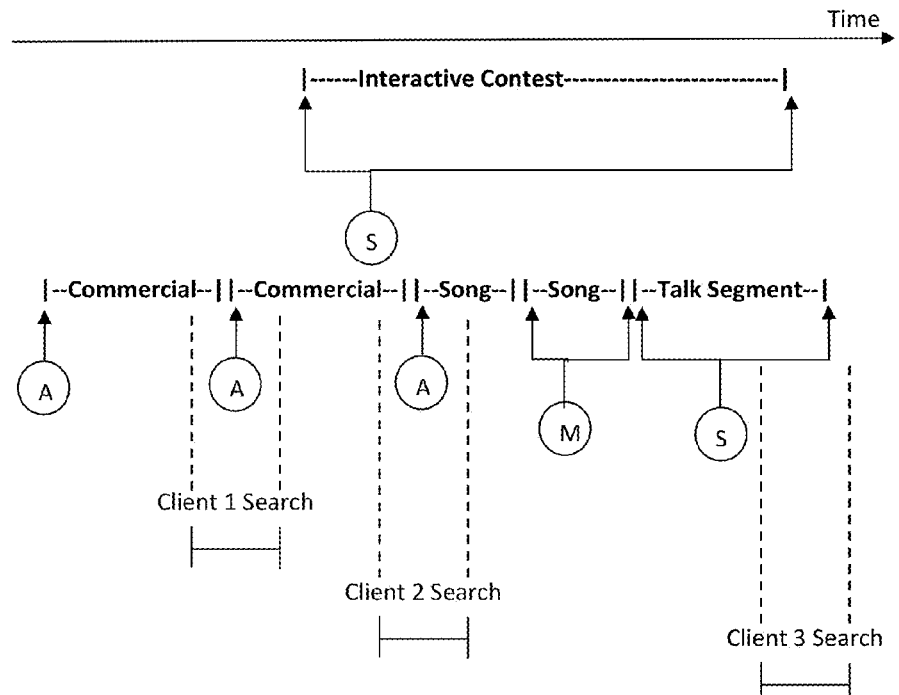
FIG. 5 is a diagram that illustrates an example of radio content ingestion and cue tagging.

FIG. 5 is a diagram that depicts how user-radio interactions may involve radio content ingestion and cue tagging. The diagram depicts an ingested stream of time-based content from a radio station that comprises, in temporal succession, a first commercial, a second commercial, a first song, a second song, and a talk segment. Cues of first, second, and third categories of differing interactive functionality are inserted into the content stream.

The first category of cues, as indicated by A, serves to identify assets in the content stream. Cues of the first category may be automatically inserted when ingested blocks of samples find matches in a global asset index.

The second category of cues, as indicated by M, provides metadata identification. Metadata cues may be automatically inserted when searches against various metadata stores, such as databases containing radio station song playlists, or in-stream data.

The third category, as indicated by S, encompasses scheduled cues. Schedules cues may be manually created and scheduled by a user in the CMS. For example, they may be created to mark a one-off single occurrence, e.g., a contest running "today from 10 am to 5 pm", or to mark reoccurring events, e.g., an event that takes place "every Monday from 9 am to 10 am."

First, second and third search scenarios are shown. In the first scenario, user 1 sends sampling data of time-based content beginning at the end of the first commercial and continuing into the second commercial. As a result, the inventive system would match sampling data against the ingested stream and conclude that that the user was attempting to interact with either of the commercials. The user would have cues for both items "bookmarked" by default, and the user would then be able to choose between the cues for interaction In the second scenario, user 2 starts sampling at the end of the second commercial and continues into the first song. Meanwhile, a contest is being run by the radio station. During the contest, the cue for the contest may be active. In this scenario, the user would have cues for all three items "bookmarked" by default, and the user would be able to choose between the three items (second song, first commercial or contest) for interaction.

In the third scenario, user 3 starts sampling the time-based content during a talk segment, e.g., a talk show or public address announcement. Meanwhile, the same radio station contest is still running In this scenario, the user would have two items "bookmarked" by default, and the user would be able to choose between cues of the two items (talk segment or contest) for interaction.

Exemplary Interactions Between Users and Television Content

The invention may facilitate interaction between users and different types of television content conveyed via different setup, services and equipment. For example, cable, satellite, and/or internet protocol television (IPTV) technology may be used to convey content from a source to a primary device, i.e., a television set, internet-connected or otherwise. Alternatively, over-the-top (OTT) service may convey content from a source via the internet to the primary device. To facilitate user-content interaction, the inventive system may transmit information relating to the results an interaction or query to a secondary device. In addition, the results may also be pushed directly up on the screen of the primary device.

Figure 6:
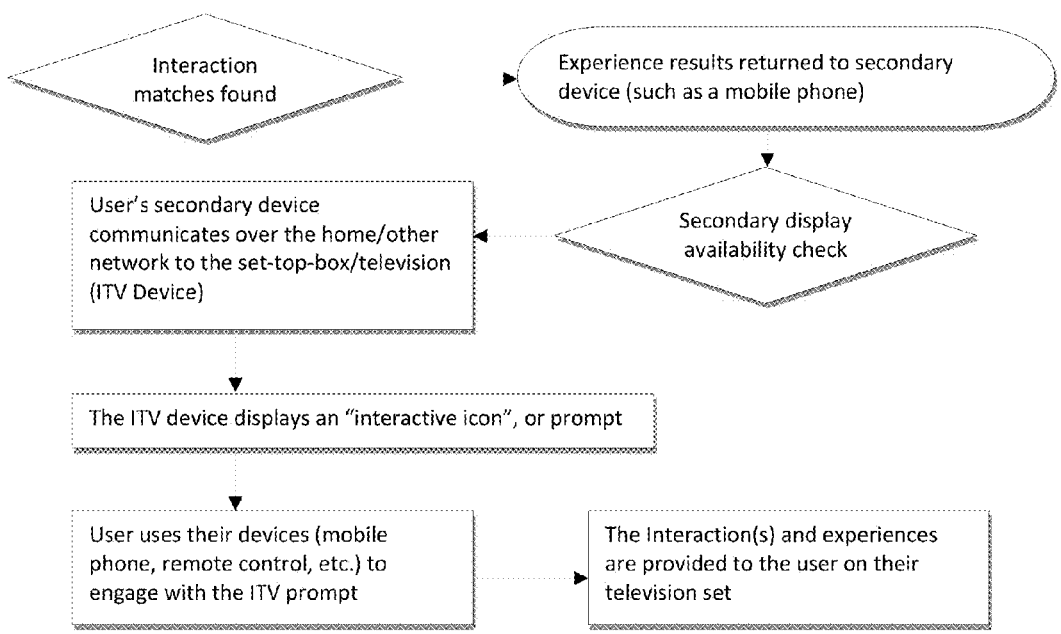
FIG. 6 is a flow chart that illustrates an example of cable/satellite/IP television workflow with network-connected equipment.
Figure 7:
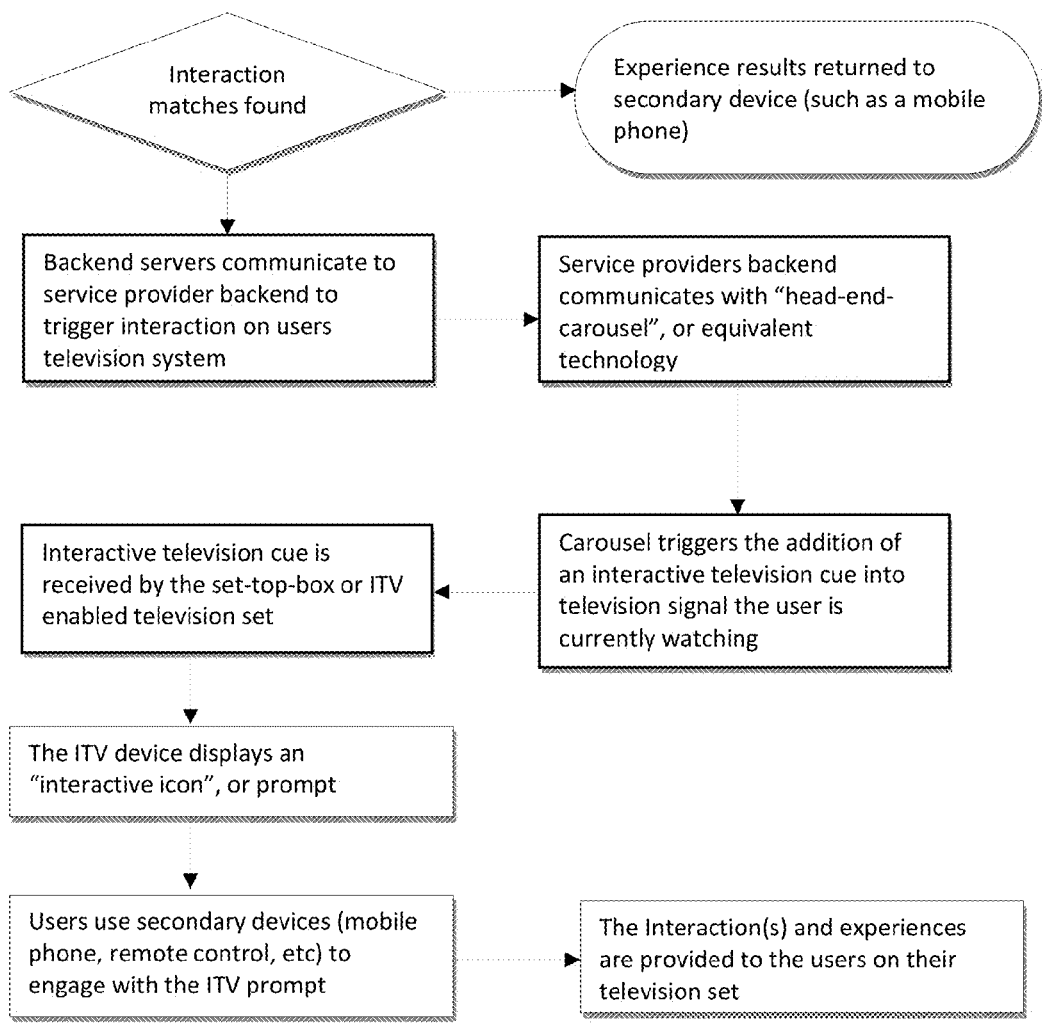
FIG. 7 is a flow chart that illustrates an example of cable/satellite/IP television workflow with a service provider back-end.

FIGS. 6 and 7 are flow charts that illustrate variations in how the invention may operate under different television content transmission environments. Each flow chart assumes a starting step that corresponds to the "Interaction Matches Found" step shown in FIG. 4.

Inventive Advantages and Variations

Thus, the invention may be advantageously used to address problems associated with known technologies. For example, the invention greatly expands the window of time in which a user may take action in order to interact with a particular segment of time-based content. Unlike prior art technologies in which a user must act while the segment is presented to the user, a user may take action long after the segment's presentation and still interact with the segment. In addition, the invention allows a user to interact with time-based content for which user-content interaction was previously impossible, e.g., live broadcasts. Furthermore, unlike known time based content searching technologies, the invention, in some embodiment, effectively performs searching by matching time-stamped sampling data with time-based content of a substantially identical time-stamp. By ignoring time-based content having a time-stamp that does not match the time-stamp of the sampling data, the invention may exhibit a dramatically improved performance and faster searching speed over than the performance and speed for known technologies. For example, information relating to matching may be transmitted, on average, to a user device within about 1, 2, 3, 4, 5, 6, 7, or 8 seconds from when sampling data is collected and/or sent to the inventive system, whereas prior art technologies tend to require about 10 or more seconds on average.

Variations of the present invention will be apparent to those of ordinary skill in the art in view of the disclosure contained herein. For example, the invention may employ fingerprinting technologies, which may be performed by the user device of the inventive system. In addition, the invention is not limited to scenarios in which sampling data is transmitted in real time to the inventive system as sampling is taking place. For example, it is possible that a primary device will be able to receive time-based content when the user device lacks connectivity to the inventive system. In such as case, the user device may sample, time-stamp, and store the time-based content for later transmission to the inventive system when connectivity is (re)established. Other variations of the invention may be discovered upon engaging in routine experimentation during the ordinary course of the practice of the invention.

It is to be understood that, while the invention has been described in conjunction with the preferred specific embodiments thereof, the foregoing description merely illustrates and does not limit the scope of the invention. Numerous alternatives and equivalents exist which do not depart from the invention set forth above, and such alternative and equivalents not specifically set forth in the claims are encompassed by the claims unless specifically excluded. Furthermore, any particular embodiment of the invention may be modified to include or exclude features of other embodiments. Other aspects, advantages, and modifications within the scope of the invention will be apparent to those skilled in the art to which the invention pertains.

All patents and publications mentioned herein are hereby incorporated by reference in their entireties to an extent not inconsistent with the disclosure provided above.

What is claimed is:

1. A method for facilitating user and time-based content interaction upon user instruction, comprising:
    (a) using a content receiver to receive time-based content from a source of time-based content;

(b) carrying out an analysis of the time-based content received by the content receiver as the content is received as content blocks, the analysis comprising searching the content blocks against pre-computed content media signatures and/or metadata, and
generating at least one cue to mark at least one interactive point in the time-based content in a database if a match is found between the blocks and the pre-computed content media signatures and/or a match is found between the blocks and metadata;

(c) receiving user sampling data from a user device upon user instruction, wherein the device is capable of receiving time-based content from the source of time-based content substantially simultaneously to when the time-based content is received;

(d) determining, without relying on watermark matching, whether a match exists between the sampling data received by the sampling data receiver and the time-based content received by the content receiver; and (e) transmitting information relating to the sampling data to the user device according to whether a match is determined in step (d) in a manner such that the information is received by the user device within 8 seconds of when step (c) begins, wherein the information transmitted during step (e) comprises the at least one cue generated in step (b), the cue being associated with time-based content received in step (a) that precedes when user instruction is given to receive user sampling data during step (c).

2. The method of claim 1, wherein step (a) comprises receiving time-based content from a plurality of sources of time-based content.

3. The method of claim 2, wherein step (a) comprises receiving time-based content simultaneously from the sources of time-based content.

4. The method of claim 3, wherein step (a) comprises receiving time-based content from a television station, radio station, and/or an internet content provider.

5. The method of claim 3, wherein step (a) comprises receiving time-based content via cable, satellite, and/or cellular signals.

6. The method of claim 1, wherein the content blocks are about 1 to about 6 seconds in duration.

7. The method of claim 1, wherein
step (b) further comprises computing content signatures on the content blocks, and
step (d) comprises using the content signatures to determine whether the match exists.

8. The method of claim 1, wherein at least one time based cue is generated to mark at least one interactive point in the time-based content in the database.

9. The method of claim 1, wherein at least one metadata cue is generated to mark at least one interactive point in the time-based content.

10. The method of claim 1, wherein step (c) comprises (c1) collecting the data received by user sampling data receiver as successive data blocks.

11. The method of claim 10, wherein the data blocks are about 1 to about 6 seconds in duration.

12. The method of claim 1, wherein step (c) comprises receiving optical and/or audio sampling data.

13. The method of claim 1, wherein the information transmitted during step (e) identifies the source of time-based content associated with the match.

14. The method of claim 1, wherein the information transmitted during step (e) pertains to at least one cue and/or asset associated with the match.

15. The method of claim 1, wherein the information transmitted during step (e) pertains to time-based content received during at least step (c).

16. The method of claim 1, wherein the information transmitted during step (e) is useful to the user for engaging in an activity selected from
delivery of content,
participating in a survey, quiz, or poll,
initiating or taking a call,
requesting for information,
engaging in a commercial transaction,
adding a calendar event or reminder, and
adding a contact to an address book.

17. A method for a user, upon user instruction, to interact with time-based content from an apparatus that receives time-based content from a source and can present the content to the user, comprising:

(a) using a user device to sample the time-based content received and/or presented by the apparatus, thereby generating sampling data;

(b) instructing the user device to transmit sampling data to a computer system for facilitating user and time-based content interaction upon user instruction, the computer system comprising
a content receiver for receiving time-based content from the source of time-based content;
a substantially real-time content analyzer that analyzes the time-based content as the content is received by the content receiver as content blocks, the analyzer configured for
searching the content blocks against pre-computed content media signatures and/or metadata, and
generating at least one cue to mark at least one interactive point in the time-based content in a database if a match is found between the blocks and the pre-computed content media signatures and/or a match is found between the blocks and metadata;
a sampling data receiver for receiving sampling data from a device of a user that is capable of sampling time-based content from the source of time-based content substantially simultaneously to when the content receiver receives the time-based content;
an identification engine for determining, without relying on watermark matching, whether a match exists between the sampling data and the time-based content; and
a transmitter for transmitting information relating to the sampling data according to whether the identification engine determines that the match;

(c) using the user device to receive the information relating to the sampling data within 8 seconds from when step (b) begins,
wherein the information received during step (c) comprises the at least one cue generated by the computer system, the cue being associated with time-based content from the source that precedes step (b).

18. The method of claim 17, wherein the user device is detached from the apparatus.

19. The method of claim 17, wherein the user device comprises a computer, cellular phone and/or a set-top box.

20. The method of claim 17, wherein the user device and the apparatus are physically connected to each other.

21. The method of claim 17, wherein the user device and the apparatus form a unitary item.

22. The method of claim 17, wherein step (a) comprises
(a1) having the apparatus present the time-based content to the user, and (a2) activating the user device to sample the content presented in step (a1).

23. The method of claim 22, wherein step (a2) comprises activating the user device via touch, sound input, and/or light input.

24. The method of claim 17, wherein step (a) comprises
(a1) having the apparatus present the time-based content to the user, and
(a2) having the user device automatically to sample the content presented in step (a1).

* * * * *